Sept. 16, 1924.　　　　　　1,508,926
T. R. COOK
STORAGE BATTERY CELL COVER
Filed Oct. 8, 1921
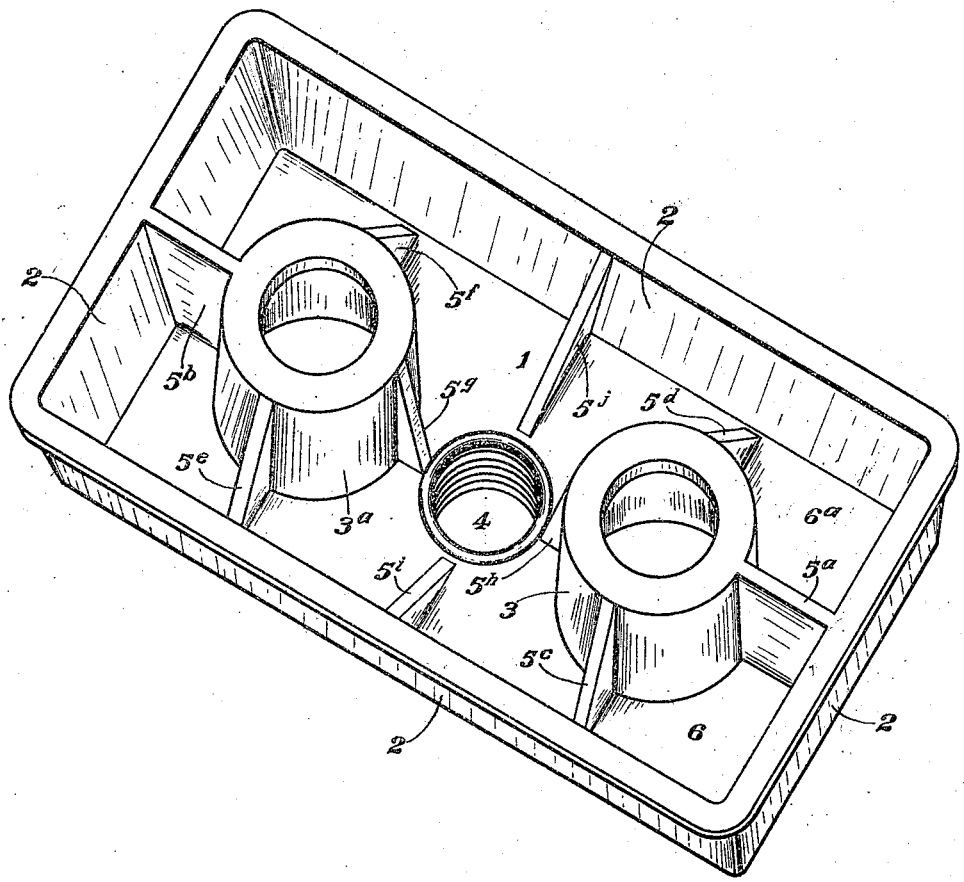
Thomas R. Cook,
INVENTOR,
BY A. L. Vencill
ATTORNEY Patented Sept. 16, 1924.

1,508,926

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY-CELL COVER.

Application filed October 8, 1921. Serial No. 506,322.

*To all whom it may concern:*

Be it known that I, THOMAS R. COOK, a citizen of the United States, residing at Pittsburgh, in the county of Allegheny and State of Pennsylvania, have invented certain new and useful Improvements in Storage-Battery-Cell Covers, of which the following is a specification.

My invention relates to covers for storage battery cells or jars, and has for an object the provision of a cover having no pockets on its under side in which gases can be trapped.

I will describe one form of cover embodying my invention, and will then point out the novel features thereof in claim.

The accompanying drawing is a view illustrating in perspective one form of cover embodying my invention, the cover being inverted in the drawing to show the construction of the under side.

Referring now to the drawing, the cover comprises a plate 1 having a depending marginal flange 2, the lower edge of which is flared outwardly to engage the inner walls of the battery jar. Also depending from the plate 1 are two sockets 3 and $3^a$ adapted to receive the two terminal posts of the battery cell. Between these two sockets is a vent hole 4 which is threaded or formed in other suitable manner to receive a vent plug (not shown) provided with a small orifice for the escape of gases which are generated within the cell.

In order to give the cover the desired strength and rigidity, it is provided with a number of ribs $5^a$, $5^b$, etc. The longitudinal rib $5^a$ extends from a point on socket 3 opposite the hole 4 to the adjacent end flange, while the corresponding rib $5^b$ for socket $3^a$ extends from the corresponding point on this socket to the end flange nearest to such socket. Socket 3 is provided with two transverse ribs $5^c$ and $5^d$, and socket $3^a$ with two transverse ribs $5^e$ and $5^f$. It will be seen at once that socket 3, the marginal flange 2, and the ribs $5^a$, $5^c$ and $5^d$ form two pockets 6 and $6^a$ on the under side of the cover, and that if the ribs $5^c$ and $5^d$ were made to extend solidly from socket 3 to the adjacent side flanges of the cover, that is, if these ribs were similar to rib $5^a$, then the gases generated within the battery would collect in these pockets and could not escape therefrom. These gases are explosive, so that if a spark should then occur within the cell, the battery would be damaged or destroyed. To avoid this, I form the ribs $5^c$ and $5^d$ in such manner that gases can escape from the pockets 6 and $6^a$, or in other words, in such manner that there are no closed pockets in the cover. As here shown, this is accomplished by making each rib triangular in shape, one edge being against the socket 3 and another edge against the plate 1, this latter edge extending towards but not quite as far as the flange 2. It follows that any gases which collect in the pockets 6 and $6^a$ are free to flow out of these pockets along the under surface of plate 1 and so to escape through the vent hole 4. Ribs $5^e$ and $5^f$ are constructed in the same manner as ribs $5^c$ and $5^d$, and for the same reason.

The other ribs $5^g$, $5^h$, $5^i$ and $5^j$ are likewise triangular in shape, but mainly to facilitate inspection of the battery interior through the vent hole 4 and to accommodate the vent plug socket when a number of similar covers are nested together for shipment or storage.

Although I have herein shown and described only one form of storage battery cover embodying my invention, it is understood that various changes and modifications may be made therein within the scope of the appended claim without departing from the spirit and scope of my invention.

Having thus described my invention, what I claim is:

A storage battery cell cover comprising a plate having a depending marginal flange, two spaced depending terminal post sockets, and a vent hole located between said sockets, a rib extending from each socket on the side opposite said vent hole to the adjacent flange, and two other ribs between each socket and the marginal flange, whereby two pockets are formed by each socket and said flange and ribs, the two last-mentioned ribs for each socket being so formed as to leave a path for the flow of gases from each pocket to said vent hole along the under surface of said plate.

In testimony whereof I affix my signature.

THOMAS R. COOK.